US008095441B2

(12) United States Patent
Wu et al.

(10) Patent No.: US 8,095,441 B2
(45) Date of Patent: Jan. 10, 2012

(54) METHOD AND SYSTEM FOR ADMINISTERING MONEY LAUNDERING PREVENTION PROGRAM

(75) Inventors: Bruce Wu, Jersey City, NJ (US); Wai-Ki Hui, New Providence, NJ (US); Arvydas Balionis, Hoboken, NJ (US); Erika Wessel, New York, NY (US); David W. Cheng, Green Brook, NJ (US); Harvey Kaminsky, Merrick, NY (US); Kenneth Kollar, Staten Island, NY (US); Patrick Kidney, Kinnelon, NJ (US)

(73) Assignee: Barclays Capital Inc., New York, NY (US)

( * ) Notice: Subject to any disclaimer, the term of this patent is extended or adjusted under 35 U.S.C. 154(b) by 865 days.

(21) Appl. No.: 11/264,816

(22) Filed: Nov. 1, 2005

(65) Prior Publication Data

US 2007/0100744 A1   May 3, 2007

(51) Int. Cl.
 *G06Q 40/00* (2006.01)
(52) U.S. Cl. ........................................................ 705/35
(58) Field of Classification Search ................ 705/35
 See application file for complete search history.

(56) References Cited

U.S. PATENT DOCUMENTS

| 7,006,992 | B1 * | 2/2006 | Packwood ..................... 705/38 |
| 2004/0128186 | A1 | 7/2004 | Breslin et al. | |
| 2004/0236714 | A1 * | 11/2004 | Eisenberger et al. ............. 707/1 |
| 2005/0091076 | A1 | 4/2005 | McGovern | |
| 2005/0197952 | A1 | 9/2005 | Shea et al. | |
| 2005/0267827 | A1 * | 12/2005 | Grant et al. ..................... 705/35 |
| 2006/0089894 | A1 * | 4/2006 | Balk et al. ........................ 705/35 |
| 2006/0116898 | A1 | 6/2006 | Peterson | |
| 2006/0259336 | A1 * | 11/2006 | Anas et al. ........................ 705/7 |

OTHER PUBLICATIONS

Chism et al., "A comparison of the single and double factor high-risk models for risk assignment of prostate cancer treated with 3D conformal radiotherapy", International Journal of Radiation Oncology, vol. 59, Issue 2, Jun. 1, 2004, pp. 380-385, ISSN 0360-3016, DOI: 10.1016/j.ijrobp.2003.10.059.*
International Search Report: International Application No. PCT/US06/25137; International Filing Date: Jun. 28, 2006; Priority Date: Nov. 1, 2005; Applicant: Lehman Brothers Inc.; 5 pages, Dec. 18, 2006.

* cited by examiner

*Primary Examiner* — Lindsay M Maguire
*Assistant Examiner* — Eric T Wong
(74) *Attorney, Agent, or Firm* — Morgan Lewis & Bockius LLP

(57) ABSTRACT

A money laundering prevention program administered by a financial institution. A plurality of risk factors associated with a potential for conducting illicit activities in connection with an account held at the financial institution are identified. The risk factors include jurisdiction-based risk factors, entity type-based risk factors, and/or business type-based risk factors. The risk factors are ranked and, based on the rank, each of the risk factors is assigned to a tier. Each of the tiers represents a level of risk that illicit activities will be conducted in connection with the account.

21 Claims, 7 Drawing Sheets

Fig. 2A

| Country Code Indicator | Country | Links | Tier 5 | Tier 4 | Tier 3 | Tier 2 | Tier 1 | OFAC | 311 USSM | Other sanctions | NCCT | 311 USMLC |
|---|---|---|---|---|---|---|---|---|---|---|---|---|
| AF | AFGHANISTAN | | | | | | | | | | | |
| AL | ALBANIA | 👉 | • | | | | | • | | | | |
| | ALDERNEY | | | | | | | | | | | |
| DZ | ALGERIA | | | • | | | | | | | | |
| AS | AMERICAN SAMOA | 👉 | | • • | | | | | | | | |
| AD | ANDORRA | | | | • | | | | | | | |
| AO | ANGOLA | | | • | | | | | | | | |
| AI | ANGUILLA | | | • | • | | | | | | | |
| AG | ANTIGUA AND BARBUDA | 👉 | | • | | | | | | | | |
| AR | ARGENTINA | | | | | • | | | | | | |
| AM | ARMENIA | | | • • | | | | | | | | |
| AW | ARUBA | | | • | • | | | | | | | |
| AU | AUSTRALIA | | | | | | | | | | | |
| AT | AUSTRIA | | | • | | | | | | | | |
| AZ | AZERBAIJAN | | | | • | | | | | | | |
| BS | BAHAMAS | 👉 | | • | • | | | | | | | |
| BH | BAHRAIN | | | | | | | | | | | |
| BD | BANGLADESH | | | • | | | | | | | | |
| BB | BARBADOS | | | • • | | | | | | | | |
| BY | BELARUS | | | | | | | | | | | |
| BE | BELGIUM | | | | | | | | | | | |
| BZ | BELIZE | | | • • | | | | | | | | |
| BJ | BENIN | | | | | | | | | | | |
| BM | BERMUDA | | | | • | | | | | | | |
| BT | BHUTAN | | | • • | | | | | | | | |
| BO | BOLIVIA | | | | | | | | | | | |
| BA | BOSNIA AND HERZEGOVINA | | • | | | | | • | | | | |

FIG. 2B

| Country Code (indicator) | CPI Score 2005 | NCCT | Offshore Financial Services ||||  INCSR |||||||
|---|---|---|---|---|---|---|---|---|---|---|---|---|
| | | | Offshore Banking | Bearer Shares | Sells Economic Citizenship | Internet Gaming | Criminalized Drug Money Laundering | Criminalized Beyond Drugs | Report Suspicious Transactions (NMP) | Financial Intelligence Unit | Record Large Transactions | Maintain Records Over Time |
| | 0-10 Scale 10=No Corruption 0=Rampant Corruption | YO=Current & Original, Y=Current, F=Former, N=No | N=No  Y=Yes  U=Unlisted ||||  N=No  Y=Yes  M=Mandatory  P=Pending  U=Unlisted |||||||
| AF | 2.5 | N | U | U | U | U | | | | | | Y |
| AL | 2.4 | N | U | U | U | U | Y | Y | M | N | N | Y |
| DZ | 0.0 | N | N | N | N | Y | Y | Y | M | Y | Y | U |
| AS | 2.8 | N | U | U | U | U | U | U | U | U | U | U |
| AD | 0.0 | N | U | U | U | U | N | N | M | N | N | N |
| AO | 0.0 | N | N | N | N | N | Y | Y | U | U | U | U |
| AI | 2.0 | N | Y | Y | N | Y | Y | Y | M | Y | Y | Y |
| AG | 0.0 | N | Y | N | N | Y | Y | Y | M | Y | N | Y |
| AR | 2.8 | N | U | U | U | U | Y | Y | M | Y | Y | Y |
| AM | 2.9 | N | U | U | U | N | Y | Y | M | Y | N | Y |
| AW | 0.0 | N | Y | Y | N | N | Y | Y | M | Y | Y | Y |
| AU | 8.8 | N | U | U | N | U | Y | Y | M | Y | Y | Y |
| AT | 8.7 | N | U | U | U | U | Y | Y | M | Y | N | Y |
| AZ | 2.2 | N | U | U | U | U | Y | N | N | N | N | Y |
| BS | 0.0 | N | Y | Y | N | Y | Y | Y | M | Y | Y | Y |
| BH | 5.8 | N | Y | Y | N | N | Y | Y | M | Y | N | Y |
| BD | 1.7 | F | U | U | N | N | Y | N | M | N | N | N |
| BB | 6.9 | N | Y | Y | N | N | Y | Y | M | Y | Y | Y |
| BY | 2.6 | N | U | U | U | N | Y | Y | M | Y | Y | Y |
| BE | 7.4 | N | U | U | U | N | Y | Y | M | Y | Y | Y |
| BZ | 3.7 | N | Y | Y | N | Y | Y | Y | M | Y | Y | Y |
| BJ | 2.9 | N | U | U | U | U | Y | N | M | Y | Y | Y |
| BM | 0.0 | N | Y | Y | N | N | Y | Y | M | Y | N | N |
| BT | 0.0 | N | U | U | U | U | U | U | U | U | U | U |
| BO | 2.5 | N | U | U | U | U | Y | Y | M | Y | N | Y |
| BA | 2.9 | N | U | U | U | U | Y | Y | M | N | N | Y |

FIG. 2C

| Country Code Indicator | INCSR | | | INCSR | | SAR Review Issue 7 | |
|---|---|---|---|---|---|---|---|
| | System for Identifying/Forfeiting Assets | Arrangements for Asset Sharing | Disclosure Protection "Safe Harbor" | ML Concern Level (PC=Primary Concern, C=Concern, M=Monitored, U=Unlisted) | IntelliMetrix Average (0-5 Scale 0=No Problems, 5=Rampant Problems, U=Unlisted) | Identified as having Shell Companies | Identified as having Shell Banks |
| AF | Y | N | Y | C | U | N | N |
| AL | Y | N | N | C | U | N | N |
| DZ | U | U | U | U | U | N | N |
| AS | N | N | N | M | U | N | N |
| AD | U | U | U | U | U | N | N |
| AO | Y | N | Y | M | U | N | N |
| AI | N | N | N | M | U | N | N |
| AG | Y | Y | Y | M | U | | |
| AR | Y | N | Y | PC | 3.67 | N | N |
| AM | N | N | Y | C | U | N | N |
| AW | Y | Y | Y | M | U | Y | N |
| AU | Y | Y | Y | C | 2.33 | N | N |
| AT | Y | Y | Y | PC | 0.33 | N | N |
| AZ | N | N | Y | PC | U | N | N |
| BS | Y | N | Y | M | U | N | N |
| BH | Y | N | Y | PC | U | N | N |
| BD | N | N | Y | C | U | N | N |
| BB | Y | N | Y | C | U | N | N |
| BY | Y | N | Y | C | U | Y | N |
| BE | Y | N | Y | C | 2.67 | N | N |
| BZ | Y | Y | Y | PC | U | N | N |
| BJ | Y | N | Y | M | U | N | N |
| BM | Y | Y | Y | M | U | N | N |
| BT | U | U | U | U | U | N | N |
| BO | Y | N | Y | C | U | N | N |
| BA | Y | N | Y | PC | U | N | N |

METHOD AND SYSTEM FOR ADMINISTERING MONEY LAUNDERING PREVENTION PROGRAM

BACKGROUND OF THE INVENTION

1. Field of the Invention

The present invention relates to systems and methods for administering a money laundering prevention program.

2. Description of the Related Art

Certain financial institutions are subject to various rules and regulations relating to anti-money laundering and fraud detection and prevention, including, by way of example, the USA Patriot Act (the "Patriot Act") and laws administered by the U.S. Treasury's Office of Foreign Assets Control ("OFAC"). These rules and regulations influence the research financial institutions undertake in approving prospective new customer accounts and managing existing customer accounts.

For example, OFAC administers a series of laws that impose economic sanctions against hostile targets to further U.S. foreign policy and national security objectives. Violation of the sanctions is a criminal offense and can result in corporate and personal liability. The regulations apply to American citizens and permanent resident aliens where ever they are located; individuals and entities located in the US; corporations organized under U.S. law (including foreign branches); and entities owned or controlled by any of these (including foreign-organized subsidiaries of U.S. corporations).

By way of further example, pursuant to Section 311, U.S. Treasury Special Measures ("USSM"), certain financial institutions are required to conduct enhanced due diligence to guard against money laundering and report any suspicious transactions where a customer is based in or operating out of a foreign country that has been designated by the Secretary of the Treasury as warranting special measures due to money laundering concerns. Upon designating a jurisdiction, financial institution, series of transactions or type of account as of primary money laundering concern, the U.S. Treasury can then impose one or more special measures delineated in section 311 (i.e., v) prohibiting a domestic financial institution or agency from opening or maintaining in the United States a correspondent account or payable-through account for or on behalf of a foreign financial institution if the account involves the designee).

Section 311, U.S. Treasury Primary Money Laundering Concern ("USMLC") provides that certain financial institutions are required to conduct enhanced due diligence to guard against money laundering and report any suspicious transactions where a customer is based in or operating out of a foreign country that has been designated "as non-cooperative with international anti-money laundering principles or procedures by an intergovernmental group or organization of which the U.S. is a member." Upon designating a jurisdiction, financial institution, series of transactions or type of account as of primary money laundering concern, the U.S. Treasury can then impose one or more special measures delineated in section 311 (i.e., i) keeping records and filing reports on particular transactions, including the identities of the participants in the transactions and the beneficial owners of the funds involved; ii) obtaining information on the beneficial ownership of any account opened or maintained in the United States by a foreign person or a foreign person's representative; iii) identifying and obtaining information about customers permitted to use, or whose transactions are routed through, a foreign bank's payable-through account; or iv) identifying and obtaining information about customers permitted to use, or whose transactions are routed through, a foreign bank's correspondent account).

There exists a vast amount of publicly-available information that may be considered by a financial institution in connection with determining whether a prospective new customer account, or an existing customer account, poses a risk of potentially conducting illicit activities at the financial institution or through accounts held at the financial institution. For example, the Financial Action Task Force ("FATF") designates certain countries and territories—Non-Cooperative Countries and Territories ("NCCTs")—as non-cooperative with international anti-money laundering principles or procedures. The Corruption Perceptions Index ("CPI") ranks countries in terms of the degree to which corruption is perceived to exist among public officials and politicians, as viewed by business people, academics, and risk analysts. The Bureau for International Narcotics and Law Enforcement Affairs releases an International Narcotics Control Strategy Report ("INCSR"), which reports on a variety of issues including whether a jurisdiction has criminalized money laundering with regard to narcotics; has criminalized money laundering beyond narcotics; mandates reporting of suspicious transactions; maintains a financial intelligence unit; cooperates with international law enforcement; allows non-bank financial institutions; criminalizes financing of terrorism; allows for international transportation of currency; requires recordation of large financial transactions; maintains various records; maintains a system for identifying/forfeiting assets; provides arrangements for asset sharing; and provides for a disclosure protection safe harbor. INCSR also categorizes jurisdictions by level of money laundering concern (i.e., primary concern, concern, monitored, unlisted). IntelliMetrix, a subscription-based service, publishes information regarding the extent to which a country has problems with crime, civil disturbance and terrorism.

Other publicly-available information includes whether a country is a member of various money laundering prevention organizations (such as FATF, APG, CFATF, MONEYVAL, ESAAMLG, GAFISUD) or other international organizations (Commonwealth Secretariat, Asia Development Bank, African Development Bank Group, Inter-American Development Bank, International Association of Insurance Supervisors, Organization of American States, World Customs Organization, Interpol, or the European Union); allows "offshore banks" to be formed; allows shell companies or shell banks; provides for International Business Companies or other similar vehicles that are generally exempt from certain requirements that would assist in fostering secrecy; allows for the issuance of bearer shares; sells economic citizenship; or permits internet gaming.

There is a need for a systematic method of using publicly-available information in connection with the administration of a money laundering prevention program, to assist a financial institution in complying with the fraud detection and prevention and anti-money laundering laws.

SUMMARY OF THE INVENTION

The present invention is directed to a method and system for administering a money laundering prevention program by a financial institution. A plurality of risk factors associated with a potential for conducting illicit activities in connection with an account held at the financial institution are identified. The risk factors include jurisdiction-based risk factors, entity-based risk factors, and/or business type-based risk factors. The risk factors are ranked and, based on the rank, each of the risk factors is assigned to a tier. Each of the tiers represents a level of risk that illicit activities will be conducted in connection with the account. At least one of the steps in the method is performed by software running on a data processing apparatus.

BRIEF DESCRIPTION OF THE DRAWINGS

The invention will be described by reference to the preferred and alternative embodiments thereof in conjunction with the drawings in which:

FIGS. 2A, 2B, and 2C show an exemplary matrix illustrating jurisdiction risk factors and the tiers to which such jurisdictions are assigned based on such risk factors;

DETAILED DESCRIPTION

An embodiment of the present invention provides for a risk-based approach to customer and/or account acceptance which incorporates the use of software and database solutions that enable expedient and comprehensive identification of customers that pose a heightened risk of conducting illicit activities at a financial institution or through accounts held at a financial institution. In particular, the risk assessment process takes into consideration multiple factors to determine the appropriate activities to be undertaken in connection with opening new accounts, and managing existing accounts, for customers of a particular entity-type, engaged in a particular kind of business, and/or associated with a particular jurisdiction that pose such a risk.

Figure 1:
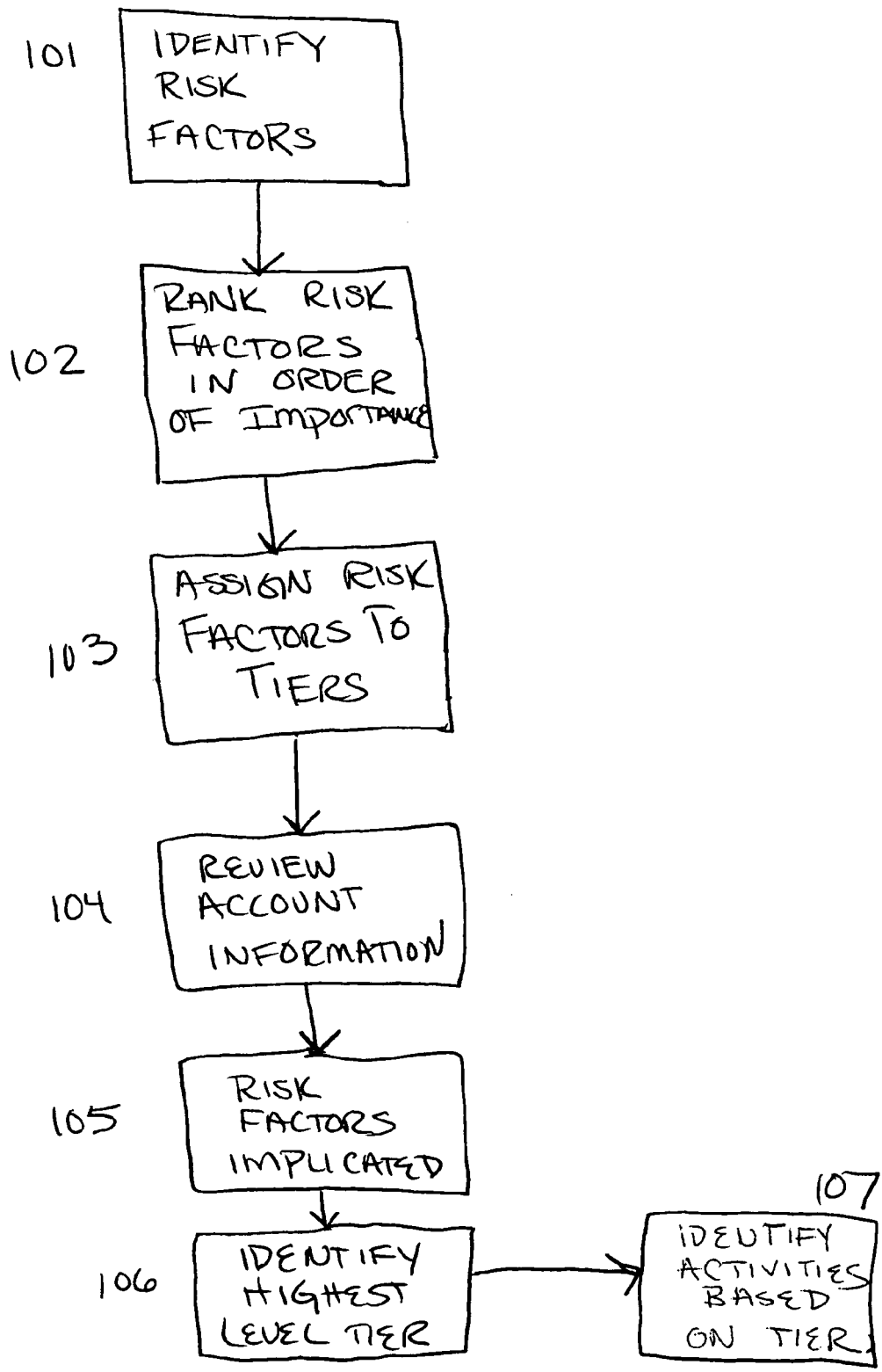
FIG. 1 is a flow chart illustrating a preferred embodiment of a method of the present invention.

FIG. 1 is a flow chart illustrating a preferred embodiment of a method of the present invention. In the one embodiment, one or more of the steps of FIG. 1 are performed by software running on a data processing apparatus. In particular, a user inputs information, using an computer interface, which is then processed by a computer. In step 101, a plurality of risk factors associated with a potential for conducting illicit activities in connection with an account held at a financial institution are identified. The risk factors include, in the preferred embodiment, jurisdiction, entity-type and/or business-type based risk factors. The risk factors provided below are exemplary only; different or additional risk factors may be considered within the scope of the present invention.

Jurisdiction based risk factors include any country or territory associated with the account (for example, the account holder residence, mailing address, citizenship). Entity-type based risk factors include the types of entitles associated with the account (for example, whether any entity associated with the account is a corporation, limited liability company, professional corporation, personal holding company (i.e., a shell company used by underlying beneficiaries), trust, or an individual). Business-type based risk factors include the types of entities carrying out the business and/or the nature of the business associated with the account (for example, whether the business is carried out through a particular entity type (see above), or the nature of the business, such as, for example, real estate financing, aviation financing, insurance or investment banking).

In step 102, the risk factors are ranked in order of importance. Thus, for example, with respect to jurisdiction risk factors, whether a particular country associated with the account has had sanctions imposed may be more important than whether a particular country associated with the account has not criminalized money laundering beyond narcotics violations. With respect to entity-type risk factors, whether a customer is associated with an operating entity is less important than whether a customer is associated with a personal holding company (given that a personal holding company is a non-operating entity used to facilitate financial transactions, for the benefit of an individual, family or group of individuals).

In step 103, based on the rank of each of the risk factors, the risk factors are assigned to one of a number of tiers. Each tier represents a level of risk that illicit activities could be conducted in connection with the account. The following provides a description of exemplary tiers in accordance with a preferred embodiment of the present invention. This tiering scheme is exemplary only; other tiering schemes, including the factors and considerations that would cause a risk factor to be assigned to a particular tier, will be known to those skilled in the art and are within the scope of the present invention.

With respect to jurisdiction-based risk factors, tier 5 countries are those subject to economic sanctions (e.g., OFAC sanction) or Special Measures under the Patriot Act. Tier 4 jurisdictions pose heightened risks of conducting potentially illicit activities at a financial institution or through its accounts. For example, tier 4 countries may include NCCTs or countries designated as Primary Money Laundering Concerns by the U.S. Treasury. Tier 4 countries may also include those jurisdictions included on a list created based on consideration of publicly available information, such as: perceived levels of corruption in the jurisdiction, whether off-shore banking services are available in the jurisdiction, whether money laundering is a criminal offense in the jurisdiction, whether the jurisdiction includes a financial intelligence unit, whether the jurisdiction cooperates with international law enforcement, and whether the jurisdiction is linked with terrorist financing.

Tiers 3, 2 and 1 include jurisdictions that pose lower risks of conducting potentially illicit activities at a financial institution or through its accounts than tier 4, 3, and 2 jurisdictions, respectively. Jurisdictions are assigned to tiers 3, 2 and 1 based on criteria similar to that considered with respect to whether to include a country as a tier 4 country, as set forth above. Tier 3 jurisdictions may also include jurisdictions that the FATF periodically identifies as posing some level of concern.

FIGS. 2A, 2B, and 2C show a portion of an exemplary matrix that may be used in connection with the present invention. This matrix identifies the various jurisdictions, the factors reviewed with respect to each jurisdiction, and the tiers to which the jurisdictions have been assigned based on the review of these factors.

As with jurisdiction risk factors, entity-type and business-type risk factors are assigned to tiers. For example, corporations, limited liability companies, professional corporations, and individuals may be assigned to tier 1 or tier 2. Personal holding companies or trusts may be assigned to tier 4. Financing companies may be assigned to tier 3 or 4, whereas publicly traded companies may be assigned to tier 1 or 2.

Figure 3:
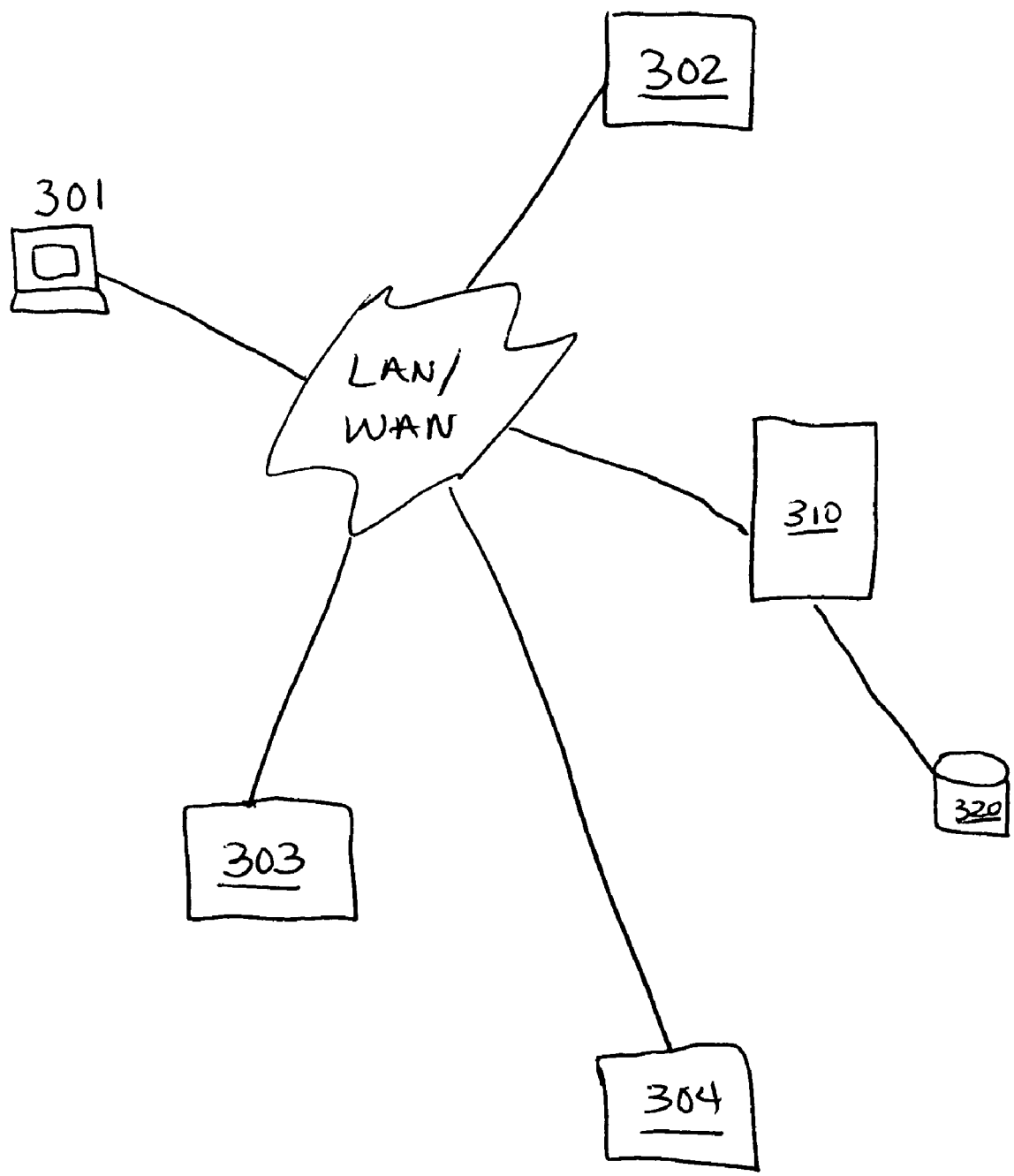
FIG. 3 illustrates an exemplary system for carrying out the methods of the present invention.

The risk-based approach of the present invention can be incorporated into certain automated systems of a financial institution, such as the customer approval, tracking, and/or review process. FIG. 3 illustrates an exemplary system for carrying out the methods of the present invention. A business initiator 301 at a client station inputs account (i.e., new or existing) information. Such information is received at server(s) 310, which includes software for reviewing the account information and identifying risk factors associated therewith. In communication with server 310 is database(s) 320, for storing account-associated data. Depending on the risk factors/tiers associated with the account, various review processes are triggered and carried out by one or more of a money laundering prevention group ("MLPG") 302 and an enhanced due diligence ("EDD") review group ("DDRG") 303. In some embodiments, in certain circumstances, account data is forwarded to third party vendors 304 to validate certain aspects of the account data against databases of stored data.

Referring back to FIG. 1, information submitted in connection with the account is captured and reviewed, in step 104. The review process is preferably undertaken when a new client is created; for an existing client in conjunction with a new account request; and/or when maintenance is performed on an existing account or client. Other embodiments of the present invention may require the review process to be undertaken on additional or different occasions.

In step 105, it is determined whether the information reviewed implicates any of the risk factors. For example, the jurisdictions with which the account is affiliated (such as the country of tax residence of the account; legal address for the account; mailing address for the account; country of citizenship or incorporation of the client; country of tax residence for the client; legal address of the client; passport country of issuance; or other addresses); the types of businesses associated with the account (such as real estate or aviation financing groups); and the types of entities associated with the account (such as corporations, limited liability companies, professional corporations, individuals, personal holding companies, or trusts) are identified.

In step 106, the highest level tier to which any of the implicated risk factors is assigned is identified. Thus, for example, assume a request for a new account involves a non-operating entity as the account holder (tier 4), organized under the laws of the Russian Federation (tier 4). The mailing address for the account, however, is in the United States (tier 1). Because the highest level tier implicated is tier 4, handling of the account request will be governed by that tier.

In step 107, based on the highest level tier identified in step 106, certain activities to be performed in connection with the account are identified. Such activities, described in more detailed below, are exemplary only; additional or different activities may be undertaken within the scope of the present invention.

For example, no business may be undertaken for any customer whose account information implicates tier 5 without the prior and express approval of the MLPG 302. Thus, tier 5 account requests trigger an electronic message to the MLPG 302, requesting review. Such requests are queued pending MLPG 302 review. The MLPG 302 may approve, reject or ask for more information relating to a tier 5 account request. If rejected, the request must be run through the workflow again once the change has been made. In one embodiment, a workflow consists of several stops/reviews starting with an initiator 301 of the request. When a request is rejected, it is returned to the initiator's queue. If the initiator 301 makes a change and resubmits, the requests will be processed through all the stops, including those it may have passed through successfully after being submitted by the initiator 301 the first time. If more information is needed, the automated system can be used to allow questions and answers to pass between the initiator 301 and the MLPG 302. In a preferred embodiment, a warning will appear in connection with account requests relating to a tier 5 customer, along with a summary of account data advisory indicating the data field(s) containing the tier 5-level data. In addition, a tier 5 indicator will appear along with the data to each individual in the workflow associated with the account request.

Customers whose account information indicates tier 4 may be required to provide additional identification documentation than that which is typically required. In addition, such customers may be subject to EDD appropriate to the relevant considerations for that customer. In particular, tier 4 account requests trigger an electronic message to the DDRG 303, requesting review. Such requests are queued pending DDRG 303 review. The DDRG 303 may ask for more information relating to a tier 4 account request, or forward the request to MLPG 302. If more information is needed, the automated system can be used to allow questions and answers to pass between the initiator 301 and the DDRG 303. If forwarded to MLPG 302, such requests are treated in the same manner discussed above with respect to tier 5 requests. In any event, an EDD report, prepared by the DDRG 303, will be reviewed by the MLPG 302 (except in the event of certain predefined exceptions) who will work with and advise the business initiating the account request of any relevant negative information that may be uncovered. In a preferred embodiment, a warning will appear in connection with account requests relating to a tier 4 customer, along with a summary of account data advisory indicating the data field(s) containing the tier 4-level data. In addition, a tier 4 indicator will appear along with the data to each individual in the workflow associated with the account request.

Customers whose account information implicates tier 3 may be required to provide additional identification documentation than that which is typically required. In addition, such customers will be subject to EDD contemporaneously with the customer identification and verification process. However, it is possible to undertake business transactions and/or open new accounts for such customers prior to completion of the EDD process (i.e., the risk associated with doing business with customers associated with tier 3 is lower than the risk associated with doing business with customers associated with tier 4). In these situations, the DDRG 303 will receive an electronic notification when the transaction is completed or the account is opened. Upon completion of the EDD process, the DDRG 303 will prepare a report on its findings. For tier 3 customers, the MLPG 302 will not review each EDD report; however, those reports that contain negative information or those that either fail to meet appropriate standards (e.g., insufficient information is available) or meet other standards (e.g., the customer is a charitable institution) will be reviewed by the MLPG 302.

Only certain customers whose account information indicates tier 2 or tier 1 will be subject to appropriate levels of EDD contemporaneously with account opening. As with tier 3 customers, it is possible to undertake business transactions and open new accounts prior to completion of the EDD process (i.e., the risk associated with doing business with customers associated with tier 2 or 1 is lower than the risk associated with doing business with a customers associated with tier 3). Also, as with tier 3 customers, the MLPG will not review each EDD report; however, those reports that contain negative information or those that either fail to meet appropriate standards (e.g. insufficient information is available) or meet other standards (e.g. the customer is a charitable institution) will be reviewed by the MLPG. In some embodiments, account information for tier 1 or 2 customers is automatically sent to third party vendor 304 for screening; negative information or potential OFAC matches will be provided to the initiator 301.

In connection with EDD, a variety of activities may be undertaken. In a preferred embodiment, the level of EDD undertaken depends on the level of risk presented by jurisdiction, entity-type and business-type risk factors. For example, the level of EDD undertaken with respect to a personal holding company may be based on: entity type (e.g., because a personal holding company is, by its very nature, a shell company used by underlying beneficiaries, additional information regarding the source of the funds and beneficiaries may be requested); the jurisdictions associated with the account (e.g., where the beneficiaries reside, the source of the funds, the country of incorporation); and business type (e.g., a coal company vs. an insurance company)

The information obtained through both the risk-based customer identification program ("CIP") and EDD process described above may used to help facilitate surveillance initiatives, through both customer and transactional surveillance.

In connection with transactional surveillance, the system targets fraud, money laundering and terrorist financing. In particular, the surveillance program facilitates identification of patterns of activity that are inconsistent with the customer's financial status or transactions with no apparent business purpose. A surveillance platform and anti-money laundering detection model is used to assist in detecting potential suspicious activity. Traditional "Exception reports" may also be used to assist in identifying potential suspicious activity. Certain information obtained through both the CIP and EDD processes are used as scoring factors that are fed into the transactional surveillance systems and impact the alerts that are ultimately generated. For example, if a customer has been identified as a PEP, then that customer would receive a higher score; or, if the customer is from a riskier jurisdiction, then that would raise the scoring in the surveillance model. These scores are added to scores allocated to certain detection scenarios and, in total, will determine which scenarios are reviewed.

A preferred embodiment of the transactional surveillance models targets the three stages of money laundering (i.e., placement, layering, and integration) and the four classes of transactions reportable under the USA Patriot Act (i.e., concealment of source of funds, structuring, no apparent business purpose, and terrorist financing). Customer surveillance focuses on sending customer information to vendors with databases of customer information and sanctions lists, for customer screening.

In an exemplary embodiment, server(s) 310 of FIG. 3 include a workflow server that houses a workflow engine used to control the workflow associated with the customer review/approval process.

The workflow engine allows for the management of complex business rules in the account opening process (i.e., such as those described above). The following provides a description of the general entities and methods that can be used by clients (e.g., business initiator 301) to communicate with the workflow engine.

The functionality enabled by the workflow engine provides users with the ability to perform a variety of activities. The components used to describe this functionality are defined as follows, in an exemplary embodiment. A User is a person participating in the account-opening or review process. Every user is uniquely identified by a UserID. A Group is a set of users who are authorized to perform the same actions. Every group is uniquely identified by GroupID. A Step is a single form or an automated process definition. A Route is a sequence of steps which conforms to the accounts-opening process definition. If the route includes other routes (i.e., sub-routes), each sub-route is represented as a separate step. Every route is uniquely identified by a RouteID. Every step is uniquely identified by RouteID/StepID pair. A Trip is an instance of the route assigned to the specific account that is being opened. Every trip is uniquely identified by a TripID. A Task is an instance of the step assigned to the specific trip. Every task is uniquely identified by a TaskID. A Queue is a list of tasks waiting to be executed. Every step must have a queue assigned. Every queue is uniquely identified by a QueueID. A Role is the set of permissions that allow access to one or more queues. Every group has one or more roles assigned. Every step has one or more roles assigned. Every role is uniquely identified by a RoleID. Every route has a role assigned. This role has the permission to open the trip on the route. DATA is the XML Document string attached to the trip or a task. The XML Document contains the values of the control nodes required for the workflow engine to process the automated integration steps.

User communication can vary depending on his or her business role in the workflow, but the general data flow can be separated into three sequences: starting trips, processing trips, and auditing trips. The data flows required to provide such business functionality, in an exemplary embodiment, are described as follows.

In order to start a new trip, the user requests from the workflow engine the list of routes for which he is authorized to open a trip. The engine uses the UserID to identify the assigned RouteIDs via the Group-Role-Route relationship. The engine returns the list of RouteIDs (with the brief route description). The user requests that the workflow engine open a trip upon the selected RouteID (from the authorized list). Optionally, the user may also provide the DATA Document or trip description. The workflow engine processes the request and returns the TripID. Optionally, the workflow engine may also return the first TaskID. In other embodiments, the workflow engine may further return the list of authorized GroupIDs (with the brief descriptions) for a provided UserID; the list of authorized RoleIDs (with the brief descriptions) for a provided GroupID; and/or the list of authorized RouteID and TaskID maps (with brief descriptions) for a provided Group.

In order to process trips, the user requests from the workflow engine the list of available tasks pending in the authorized queues. The workflow engine uses the UserID to identify the assigned QueueIDs. The workflow engine returns the list of QueueID (with the brief queue description and number of tasks waiting in each queue).

The user requests from the workflow engine the list of the Tasks pending in the selected QueueID (from the authorized list) and, optionally, the time interval when the task was added to the queue. The workflow engine returns the list of TaskIDs with a Route description, Step description, Trip description and Task status. Optionally, the engine may return the DATA Document attached and the locking user's ID.

The user picks the unreserved task from the available list and requests the system to lock it from other users' actions. The system returns the Task with all the details (Route description, Step description, Trip description, Task status, DATA Document and locking user's ID).

After the task is reserved, the user can unlock the task or release the task. Unlocking the task does not change the data of the task; it only removes the UserID as the locking ID of the task. Releasing the task requires the user to set a release status of the Task. The user may also set the new Document to the Trip. The engine releases the task to the calculation routine, which can calculate the next step.

In order to retrieve the list of tasks associated with the specific trip, the user may provide either or both of the TripID and the TaskID. In response, the workflow engine returns the list of Tasks with all the details (Route description, Step description, Trip description, Task status, Document and locking user's ID). In the event the user does not know the TripID or TaskID, he may retrieve the list of trips opened by specifying the UserID and the Route ID or Time interval when the trip was opened. In response, the engine returns the list of TripIDs (with the description).

Figure 4:
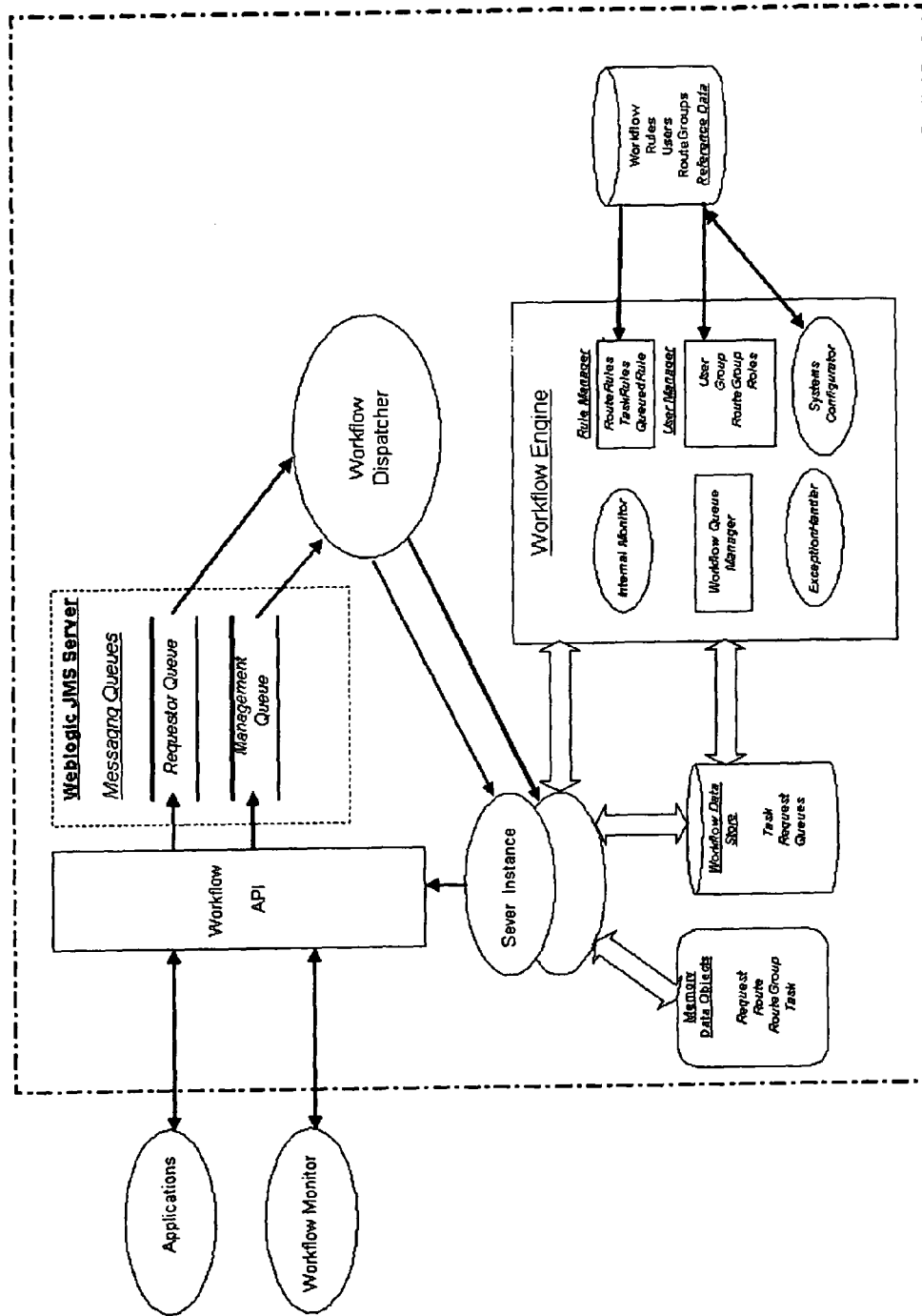
FIG. 4 is an exemplary workflow server architecture that may be used for carrying out the methods of the present invention.

An exemplary workflow server architecture is shown in FIG. 4. The exemplary components of the workflow server are described as follows. The workflow server includes a rules-based engine. The rules manager maintains rules and sets the linkage between rules and queues. The user manager/queue manager manages workflow application users; defines the linkage between inboxes (i.e., queues) and route-group-roles; and establishes relationships among users, routing-groups and roles. The process manager invokes a process within the workflow server and allows for remote execution of an application within the network. The notification manager is event driven and notifies users of events based on predefined rules.

The workflow application interfaces allow an application to be de-coupled from the workflow server engine. In an exemplary embodiment, there are two types of application interfaces: a workflow client API that allows client applications (such as the application used in connection with opening new accounts) to be driven by the rule engine; and a workflow systems management API that provides systems management functions to be accessed by external systems applications.

The workflow monitor is a systems event logger that allows the system to track different level of system events in real time. An administrator can use the monitor to manage the workflow server in real-time to monitor the system's resource usages; modify system parameters in real-time; refresh the workflow rules in real-time; push requests forward; display request summaries, queue summaries, and details; edit attributes of users and notifiers; and shut down the workflow server, by way of example.

Figure 5:
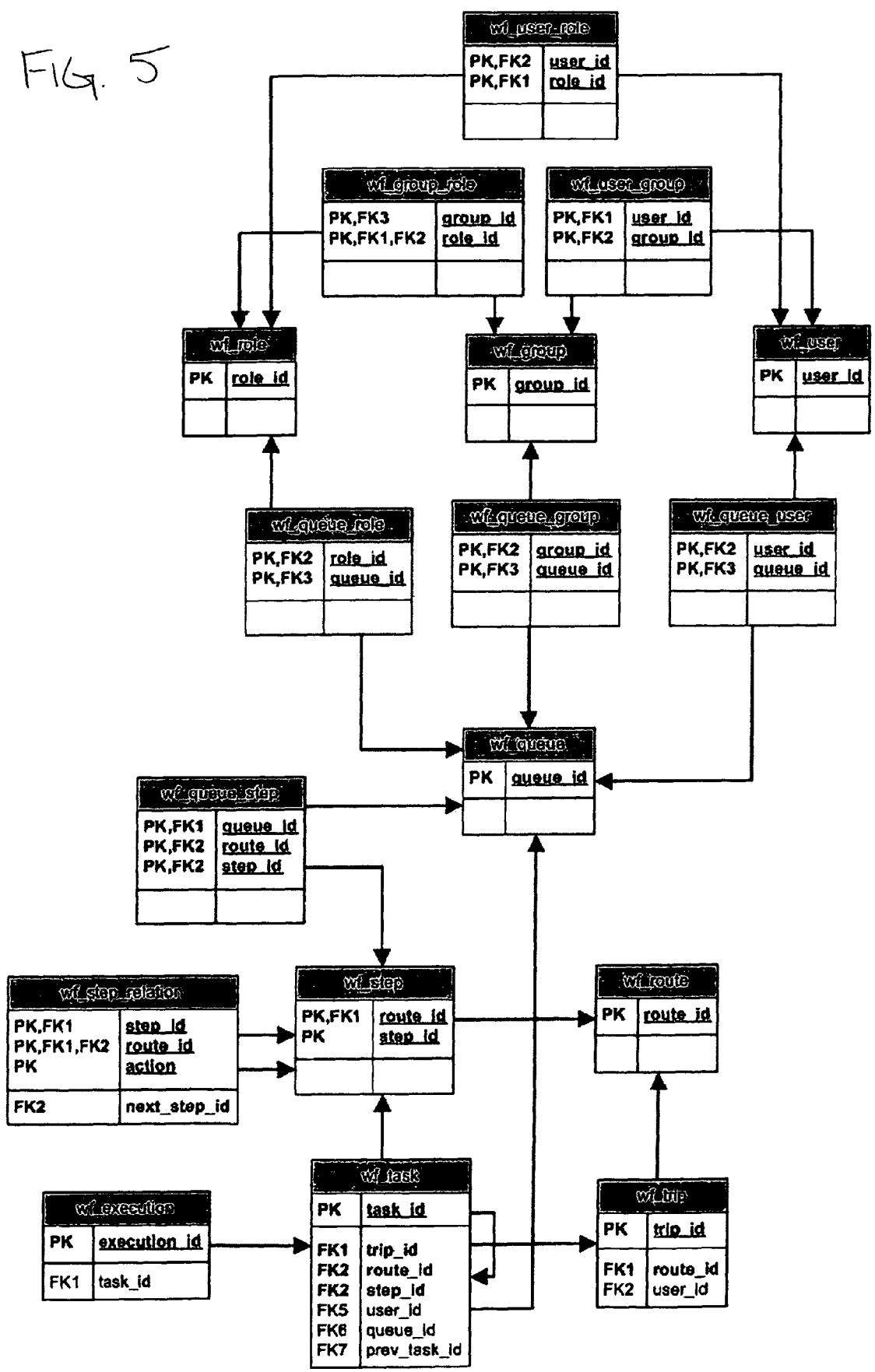
FIG. 5 is an exemplary database schema specification showing certain data elements and the relationships among them.

FIG. 5 is an exemplary database schema specification (e.g., for database(s) 320) showing certain data elements and the relationships among them.

Having thus described illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A computer-implemented method for administering a money laundering prevention program by a financial institution, comprising the steps of:
   identifying a plurality of risk factor types, each risk factor type associated with a plurality of risk factors indicating a potential for conducting illicit activities in connection with an account held at the financial institution, wherein the risk factor types comprise at least two of a jurisdiction-based risk factor type, an entity-based risk factor type, or a business type-based risk factor type;
   ranking each of the risk factors within each risk factor type in order of importance;
   assigning each of the risk factors to one of a plurality of tiers based on the rank of each of the risk factors, wherein each of the tiers represents a level of risk that illicit activities will be conducted in connection with the account;
   reviewing information submitted in connection with the account;
   determining whether the information implicates any of the risk factors;
   identifying a highest level tier to which any of the implicated risk factors is assigned; and
   identifying one or more activities to be performed in connection with the account based on the highest level tier identified;
   wherein at least one of the identifying, ranking, assigning, reviewing and determining steps is performed by software running on a data processing apparatus.

2. The method of claim 1, wherein the account is one of an existing account and a prospective new business account.

3. The method of claim 1, wherein the one or more activities comprise at least one of:
   (a) requesting identification documentation;
   (b) enhanced due diligence; and
   (c) surveillance.

4. The method of claim 1, wherein the risk factor types comprise each of a jurisdiction-based risk factor type, an entity-based risk factor type, and a business type-based risk factor type.

5. The method of claim 1, wherein the risk factors of the jurisdiction-based risk factor type include a plurality of countries, one or more of which is associated with the account.

6. The method of claim 1, wherein the risk factors of the entity-based risk factor type include a plurality of legal statuses of an entity, one or more of which is associated with the account.

7. The method of claim 1, wherein the risk factors of the business-type based risk factor type include a plurality of areas of business conducted by an entity, one or more of which is associated with the account.

8. A non-transitory computer readable storage medium having stored thereon computer executable instructions which, when executed on a computer, configure the computer to perform a method comprising:
   identifying a plurality of risk factor types, each risk factor type associated with a plurality of risk factors indicating a potential for conducting illicit activities in connection with an account held at the financial institution, wherein the risk factor types comprise at least two of a jurisdiction-based risk factor type, an entity-based risk factor type, or a business type-based risk factor type;
   ranking each of the risk factors within each risk factor type in order of importance;
   assigning each of the risk factors to one of a plurality of tiers based on the rank of each of the risk factors, wherein each of the tiers represents a level of risk that illicit activities will be conducted in connection with the account;
   reviewing information submitted in connection with the account;
   determining whether the information implicates any of the risk factors;
   identifying a highest level tier to which any of the implicated risk factors is assigned; and
   identifying one or more activities to be performed in connection with the account based on the highest level tier identified.

9. The non-transitory computer readable storage medium of claim 8, wherein the account is one of an existing account and a prospective new business account.

10. The non-transitory computer readable storage medium of claim 8, wherein the one or more activities comprise at least one of:
(a) requesting identification documentation;
(b) enhanced due diligence; and
(c) surveillance.

11. The non-transitory computer readable storage medium of claim 8, wherein the risk factor types comprise each of a jurisdiction-based risk factor type, an entity-based risk factor type, and a business type-based risk factor type.

12. The non-transitory computer readable storage medium of claim 8, wherein the risk factors of the jurisdiction-based risk factor type include a plurality of countries, one or more of which is associated with the account.

13. The non-transitory computer readable storage medium of claim 8, wherein the risk factors of the entity-based risk factor type include a plurality of legal statuses of an entity, one or more of which is associated with the account.

14. The non-transitory computer readable storage medium of claim 8, wherein the risk factors of the business-type based risk factor type include a plurality of areas of business conducted by an entity, one or more of which is associated with the account.

15. A system for administering a money laundering prevention program by a financial institution, comprising:
an interface component for receiving account data from a user pertaining to an account held at the financial institution;
a database for storing the account data; and
one or more processors operable for identifying configured to:
identify a plurality of risk factor types, each risk factor type associated with a plurality of risk factors indicating a potential for conducting illicit activities in connection with the account, wherein the risk factor types comprise at least two of a jurisdiction-based risk factor type, an entity-based risk factor type, or a business type-based risk factor type,
rank each of the risk factors within each risk factor type in order of importance,
assign each of the risk factors to one of a plurality of tiers based on the rank of each of the risk factors,
review information submitted in connection with the account,
determine whether the information implicates any of the risk factors,
identify a highest level tier to which any of the implicated risk factors is assigned, and
identify one or more activities to be performed in connection with the account based on the highest level tier indicated, wherein each of the tiers represents a level of risk that illicit activities will be conducted in connection with the account.

16. The system of claim 15 wherein, the account is one of an existing account and a prospective new business account.

17. The system of claim 15, wherein the one or more activities comprise at least one of:
(a) requesting identification documentation;
(b) enhanced due diligence; and
(c) surveillance.

18. The system of claim 15, wherein the risk factor types comprise each of a jurisdiction-based risk factor type, an entity-based risk factor type, and a business type-based risk factor type.

19. The system of claim 15, wherein the risk factors of the jurisdiction-based risk factor type include a plurality of countries, one or more of which is associated with the account.

20. The system of claim 15, wherein the risk factors of the entity-based risk factor type include a plurality of legal statuses of an entity, one or more of which is associated with the account.

21. The system of claim 15, wherein the risk factors of the business-type based risk factor type include a plurality of areas of business conducted by an entity, one or more of which is associated with the account.

* * * * *